May 30, 1944.　　　　F. C. GEDGE　　　　2,350,223
MATERIAL BREAKING APPARATUS
Filed Oct. 25, 1941　　　3 Sheets-Sheet 1
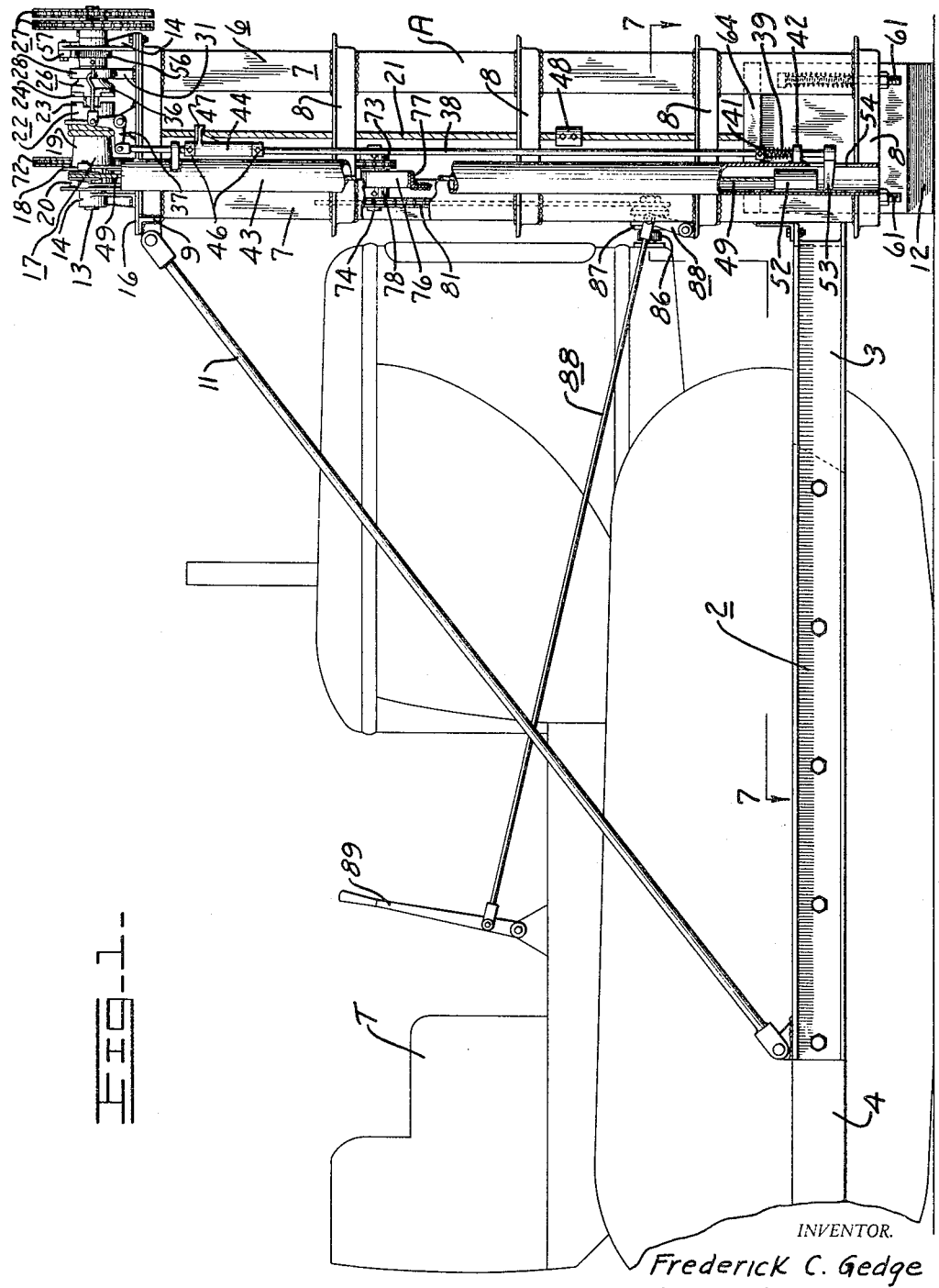
INVENTOR.
Frederick C. Gedge
BY Charles M. Fryer
ATTORNEY.

May 30, 1944.  F. C. GEDGE  2,350,223
MATERIAL BREAKING APPARATUS
Filed Oct. 25, 1941  3 Sheets-Sheet 2
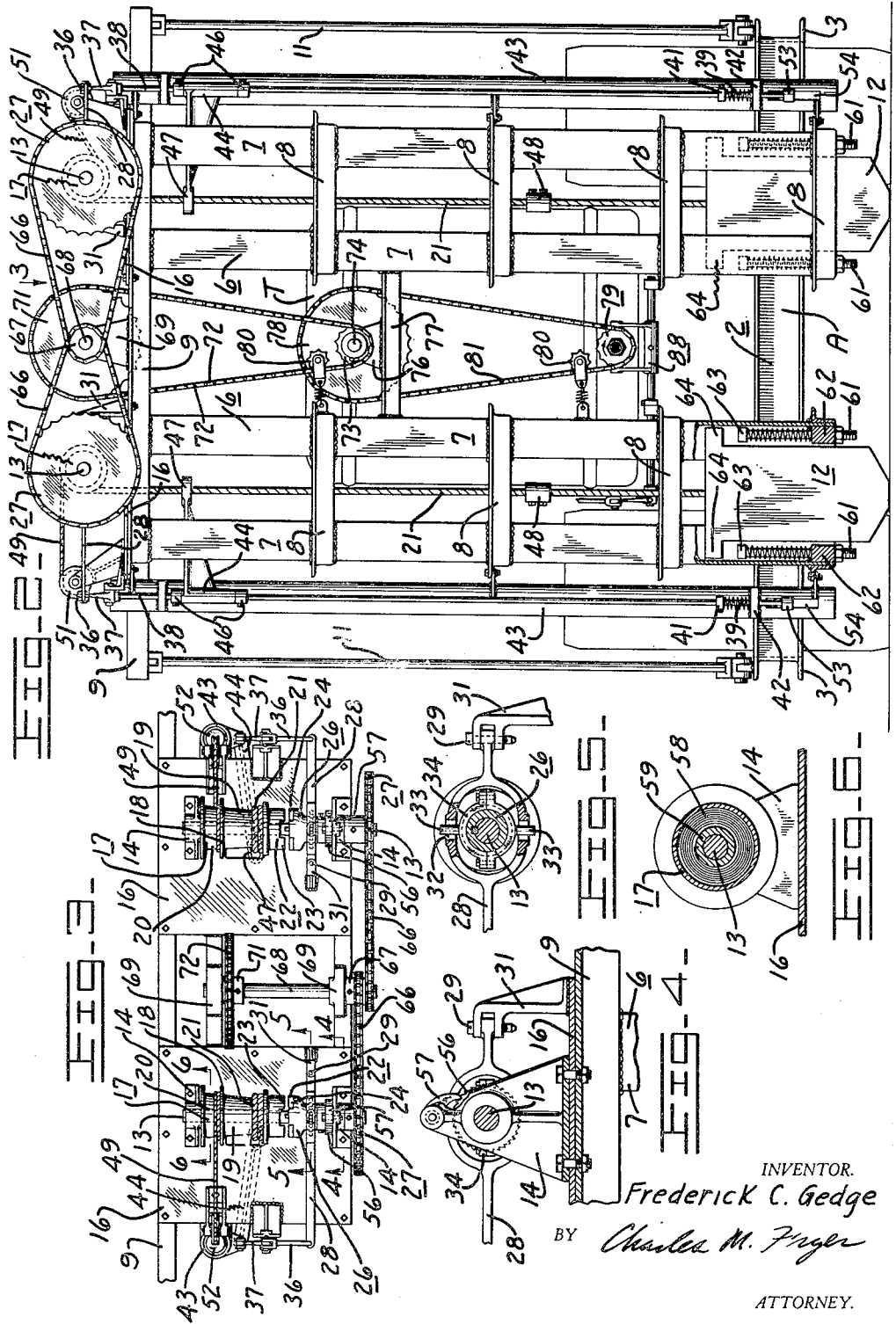
INVENTOR.
Frederick C. Gedge
BY Charles M. Fryer
ATTORNEY.

May 30, 1944.　　　F. C. GEDGE　　　2,350,223
MATERIAL BREAKING APPARATUS
Filed Oct. 25, 1941　　　3 Sheets-Sheet 3
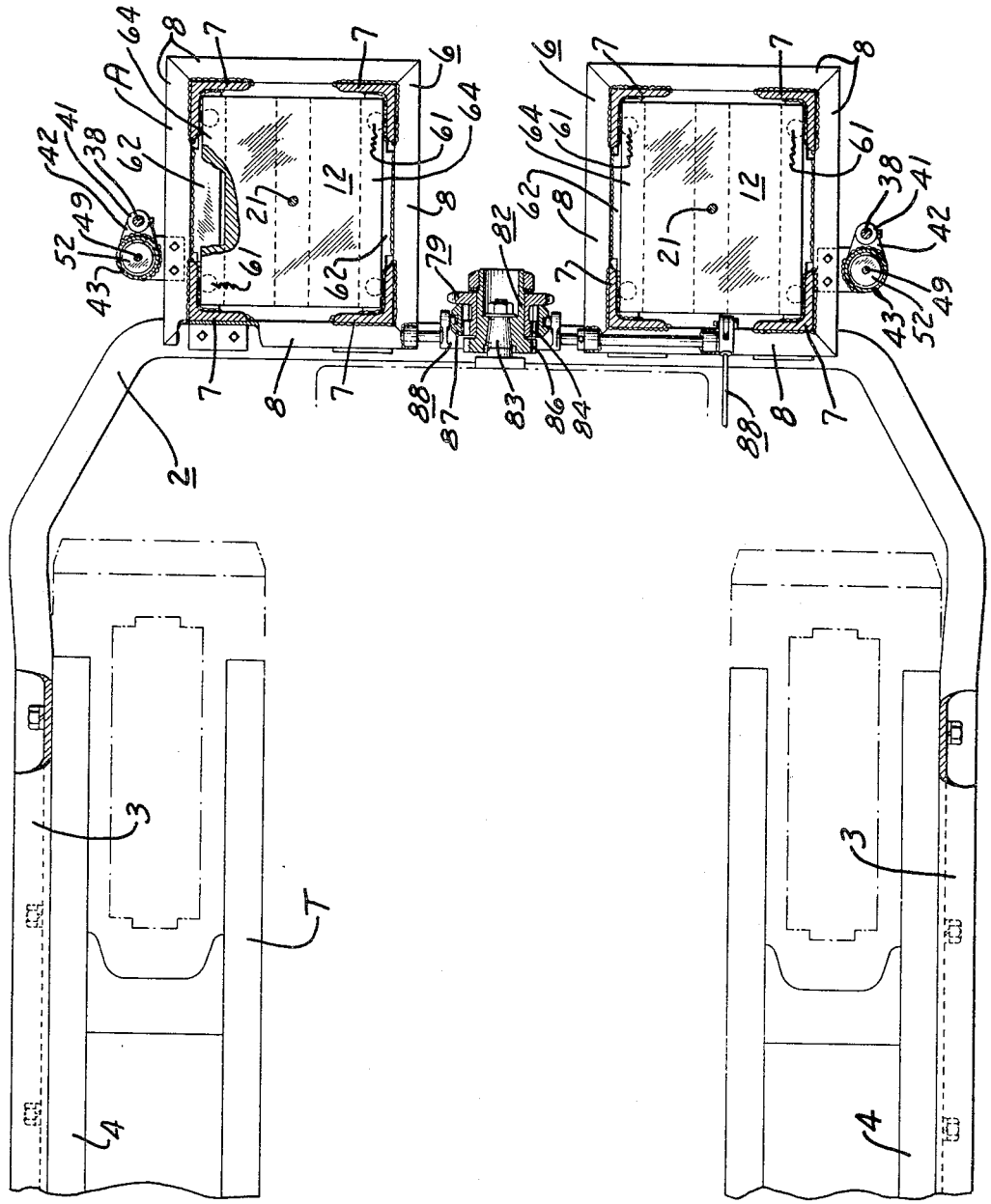
INVENTOR.
Frederick C. Gedge
BY Charles M. Fryer
ATTORNEY.

Patented May 30, 1944

2,350,223

UNITED STATES PATENT OFFICE 2,350,223

MATERIAL BREAKING APPARATUS

Frederick C. Gedge, Peoria, Ill., assignor to Caterpillar Tractor Co., San Leandro, Calif., a corporation of California Application October 25, 1941, Serial No. 416,439

13 Claims. (Cl. 262—8)

My invention relates to material breaking apparatus which is particularly adapted for the breaking of pavements.

Objects of my invention are the provision of improved apparatus for the breaking up of pavements or similar material, which is: of comparatively simple and economical construction; substantially entirely automatic in its operation; on a self-propelled vehicle to provide a mobile unit that can be rapidly driven to positions where it is required; adapted for operation by one man for controlling both propulsion of the vehicle and operation of material breaking means forming part of the apparatus; in the form of an attachment that may be readily mounted on a tractor or similar vehicle and driven from a power take-off on such machine; although embodying cable means for lifting a breaker weight means is so constructed as to preclude fouling of such cable means when the weight means fall; and which embodies a plurality of breaker weights so as to cooperate in effecting efficacious breaking of the material in relatively small irregular blocks. Other objects of my invention will become apparent from a perusal of the following description thereof.

Referring to the drawings:

Fig. 1 is a side elevation of the self-propelled apparatus of my invention; the vehicle unit of such apparatus being shown schematically and portions of the material breaking attachment of such apparatus being shown broken away to illustrate more clearly the construction.

Fig. 2 is a front elevation of the apparatus illustrated in Fig. 1 with a portion of the structure shown broken away to illustrate more clearly the construction.

Fig. 3 is a top plan view, looking in the direction of arrow 3 in Fig. 2, illustrating a portion of the driving mechanism of the apparatus.

Fig. 4 is a vertical section taken in a plane indicated by line 4—4 in Fig. 3.

Fig. 5 is a vertical section taken in a plane indicated by line 5—5 in Fig. 3.

Fig. 6 is a vertical section taken in a plane indicated by line 6—6 in Fig. 3.

Fig. 7 is a fragmentary horizontal sectional view taken in the planes indicated by line 7—7 in Fig. 1.

The material breaking apparatus of my invention comprises an attachment A adapted for detachable mounting on a tractor T. The form of tractor illustrated is a track-type tractor but it is apparent that the attachment may be mounted on a wheel tractor or any other suitable self-propelled vehicle if so desired. In this connection, attachment A is a complete unit in itself, only requiring a prime mover for operating breaker weights thereon. Consequently, if the advantages of a self-propelled unit are not required, such attachment need not be mounted on a self-propelled vehicle but may be employed per se with any suitable prime mover.

Attachment A comprises a framework including a substantially U-shaped yoke member 2 extending across the front of tractor T, the arms 3 of which are adapted for detachable mounting on the sides of truck frames 4 of such tractor. Rigidly secured to yoke 2 and in front of the tractor are a pair of spaced upright frames 6, rectangularly shaped in cross section and preferably formed of corner angles 7 suitably braced by surrounding cross members 8. Preferably, the parts of frames 6 are rigidly secured together by welding. To provide a strong and rigid assembly, the upper ends of frames 6 are tied together by front and rear cross braces 9 suitably fixedly secured thereto, such as by welding; and a strut 11 is connected between each end of rear brace 9 and an associated arm 3 of yoke 2. Each of frames 6 provides a guideway for a relatively heavy breaker weight 12 slidably mounted therein for back and forth movement; the weights being adapted to be moved upwardly under power, and when a predetermined position in their upward movement is reached, to fall downwardly by their own weight, or in other words by gravity. It will be noted that since guide frames 6 are in front of the tractor, the operation of weights 12 therein may be readily observed by the operator from the operator's station at the rear of the tractor. Also, such arrangement of the weights with respect to the operator's station provides ready visibility of the weights to enable the operator to control movement of the tractor with ease for proper positioning of the breaker weights at desired locations.

Automatic means is provided for effecting power lifting of each breaker weight 12, and falling thereof by gravity; the means being the same for each weight. Consequently, such means will only be described with respect to one of the breaker weights, but the same reference characters will be employed for corresponding parts associated with the other breaker weight. A shaft 13 is journaled in suitable bearing brackets 14 mounted on plate 16 over the top of frame 6, upon which is journaled a tapered or cone-shaped drum or spool 17 rotatable about the axis of shaft 13. Such spool is divided into two sections 19 and 20 by partition flange 18; and the section 19 of the least taper provides an anchor for a cable 21 attached to breaker weight 12; the cable being adapted to wrap around section 19 during lifting of breaker weight 12 and to unwind from such section when the breaker weight falls by gravity. The taper of spool sections 19 and 20 enables cables to be wound thereon evenly and tightly; and because of the difference in taper, it will be apparent that weights attached to cables anchored to sections 19 and 20 will be lifted to different heights and at different speeds.

Drive interrupting and establishing mechanism in the form of a clutch 22 is provided to effect a drive to spool 17 in one direction for raising of breaker weight 12; and when disengaged from the spool to allow the breaker weight 12 to fall in an opposite direction by its own weight. Such clutch 22 includes clutch element teeth 23 formed integral with the small diameter end of spool 17, and teeth 24 on a clutch element 26 mounted for rotation with but axially slidable on shaft 13. Driving of shaft 13 is effected through any suitable driving mechanism mounted on the framework of the attachment unit, including sprocket and chain connection 27 connected to an end of shaft 13. When clutch element 26 is moved axially to the position where clutch teeth 23 and 24 are in engagement, spool 17 will be driven to wind up cable 21 and raise the weight; but when the teeth are disengaged, weight 12 can fall by gravity because spool 17 is journaled about shaft 13.

Control mechanism is provided for effecting automatic raising and lowering of weight 12, comprising clutch yoke 28 pivotally connected at its inner end 29 to a suitable bracket 31 mountted on frame 6, and which is formed with opposite apertures 32 in which are engaged pins 33 secured to split collar 34 journaled in a suitable groove in clutch element 26. In this connection, apertures 32 are enlarged with reference to pins 33 to allow free axial movement of clutch element 26 when pivotal movement of yoke 29 is effected. The outer end of yoke 28 is pivotally connected to a linkage including a plurality of pivotally connected members comprising link member 36, bell-crank 37 pivotally mounted on frame 6, and upright rod 38.

Adjacent its lower end, rod 38 is biased by means of spring 39, in a direction for disengaging clutch 22. Spring 39 is compressed between a collar 41 adjustably secured to rod 38, and a fixed abutment 42 projecting from an upright tube 43 rigidly secured to frame 6. Adjacent its upper end, rod 38 has journaled thereon for pivotal movement in a horizontal plane, an arm 44 held against axial displacement between collars 46 adjustably secured to rod 38. Arm 44 has an enlarged eye 47 through which cable 21 passes. Consequently, as the cable wraps around or unwraps from spool section 19, arm 44 will pivot so that its eye end will always be in line with the cable. An adjustable collar 48 is fixedly secured to cable 21 below arm 44, and is adapted to strike arm 44 during lifting of weight 12 as the cable moves upwardly. When collar 48 strikes arm 44, rod 38 will be moved upwardly which is the direction for automatically causing clutch 22 to become disengaged after breaker weight 12 has been lifted a predetermined height, to allow such weight to fall automatically by gravity. In this connection, spring 39 is merely a relatively light spring to insure that the clutch 22 will not become accidentally engaged while the weight falls by gravity.

For effecting automatic power raising of weight 12 after it has fallen freely by its own weight, means movable downwardly with cable 21 is provided to strike rod 38, and cause it to move in a downward direction for engaging clutch 22. Such means comprises a second, control cable 49 windable about and unwindable from spool section 20, always in the same direction with cable 21. Cable 49 passes over a guide sheave 51 mounted on frame 6, and through upright tube 43 which thus serves as a guide for such cable. A relatively light weight 52 is suspended from the lower end of cable 49, and is adapted to strike against a finger 53 fixedly attached to the lower end of rod 38 and which projects into tube 43 through elongated aperture or slot 54 formed adjacent the lower end of such tube. Thus, when breaker weight 12 falls, control cable 49 will move downwardly with such weight, to the point substantially where weight 52 strikes finger 53. When the latter occurs, rod 38 will be moved downwardly to cause clutch 22 to become automatically engaged with consequent raising of breaker weight 12 by power. In this connection, spring 39 is not heavy enough to cause disengagement of clutch 22 during lifting of weight 12 because the clutch parts are under load during this period.

From the preceding, it is seen that weight 52 cooperates with finger 53, and arm 44 cooperates with collar 48, to provide trip members or elements, for controlling movements of breaker weight 12. Preferably, the length of control cable 49 unwindable from spool section 20 is such that trip weight 52 will strike trip finger 53 to cause engagement of the clutch 22, just after breaker weight 12 reaches the bottom of its fall, thus insuring that the material to be crushed will be thoroughly subjected to the impact of breaker weight 12 before it is automatically lifted. As was previously related, the taper of spool sections 19 and 20 insures that cables 21 and 49 respectively, will wind evenly and tightly about the drum. As a result, their timing relationship will always be the same. Also, since section 20 for control cable 49, has more taper than cone section 19 for breaker weight cable 21, and since both weights 12 and 52 are attached to the same drum means and lifted simultaneously, trip weight 52 will be lifted higher than breaker weight 12.

During automatic power lifting of breaker weight 12, and falling thereof by gravity, the driving mechanism including sprocket and chain drive 27 is constantly driven; except for interruption by a master clutch under control of an operator at the operator's station of the tractor, to be subsequently described. Therefore, should the drive to shaft 13 be interrupted by disengagement of such master clutch during lifting of breaker weight 12, the weight would fall. Automatic means is provided, however, to hold breaker weight 12 against falling during such period, comprising a ratchet wheel 56 fixedly secured to shaft 13 for rotation therewith, and a pawl 57 pivotally mounted above shaft 13 on an upward extension of one of bearing brackets 14. During lifting of weight 12 by power, pawl 57 is adapted to ride over the teeth of ratchet 56 but should the power be interrupted before clutch 22 is automatically disengaged to allow weight 12 to fall by gravity, the weight 12 will tend to cause shaft 13 to rotate in an opposite direction. This will cause engagement between the pawl and the ratchet to preclude falling of the weight.

When breaker weight 12, together with trip weight 52 fall by gravity, cables 21 and 49 might become fouled because of the journaling of spool 17 on shaft 13, which journaling might result in continued excessive movement of the spool after the weights have reached the predetermined lower limits of their movements. To preclude such fouling, braking means is associated with the spool to prevent excessive continued movement thereof when falling of the weight members 12 and 52 is arrested. Preferably, such braking means comprises a spirally wound spring 58 mounted with a hollow portion of spool 17 between the inside of such spool and an inwardly extending hub 59 formed integrally with one of brackets 14. One end of such spring is rigidly anchored to the hub and the opposite end is rigidly anchored to the drum; and the direction of winding of the spring is such that it will become tightened as the spool plays out the cables during falling of the weight members. Consequently, when their fall is arrested, the energy imparted to the spring because of tightening thereof will arrest movement of the spool. In this connection, spring 58 is not sufficiently strong to preclude trip weight member 52 from carrying through far enough to strike trip member 53 and cause the clutch 22 to become engaged, after weight member 12 reaches the lower limit of its fall.

Means is provided to cushion movement of breaker weight 12 should it hit a soft spot in the material being broken, and thus tend to continue further downward movement. Such means comprises a plurality of spring pressed plungers 61 slidably mounted in brackets 62 at the lower end of frame 6, and having heads 63 adapted to engage peripheral shoulders 64 at sides of the upper end of breaker weight 12.

Common driving mechanism mounted on the framework of the attachment, is provided for both of breaker weights 12 to lift the same; and in the preferred construction where the attachment is adapted for detachable mounting on a tractor or the like, the source of power is obtained from the front power takeoff of the tractor, thus obviating the necessity of a separate engine or other prime mover. Each chain 66 of each of driving connections 27 passes around a sprocket wheel 67; the two wheels 67 being fixedly secured to a common shaft 68 journaled in bearings 69 secured to the top of the framework including frames 6. Also secured to shaft 68 is a larger sprocket wheel 71 about which passes a chain 72 passing around a smaller sprocket wheel 73 fixed to a shaft 74 journaled in a bearing 76 mounted on a cross brace 77 between frames 6. Fixed to shaft 74 is another sprocket wheel 78 larger than sprocket wheel 73 and which is connected to a smaller driving sprocket wheel 79, by a chain 81. A drive from the tractor motor is imparted to driving sprocket wheel 79; and by the described sprocket and chain drives, reduction in the speed of the drive is effected for lifting of weights 12. Spring loaded idler sprockets 80 are provided for taking up slack in chains 72 and 81.

Sprocket wheel 79 is journaled about a hub 82 fixedly secured to the front power take-off shaft 83 of the tractor; and master clutching means controllable from the operator's station of the tractor, is provided for engaging and disengaging sprocket wheel 79 with respect to the front power take-off. Such clutching means comprises clutch element teeth 84 formed integral with the hub of sprocket wheel 79, and clutch element teeth 86 formed integral with hub 82. An internally toothed collar 87 movable axially through a suitable linkage connection 88 operable by control lever 89 at the operator's station of the tractor, is adapted when moved in one direction to engage both of the clutch element teeth 84 and 86 to establish a drive; and when moved in an opposite direction, so that collar 87 does not engage the teeth 86, the drive is interrupted.

The master clutch controls the entire drive to the driving mechanism for weights 12; and the clutches 22 serve as secondary clutches for automatically controlling lifting and falling of such weights. As long as the master clutch is engaged and the engine of the tractor is running, weights 12 will be operated, but should it be desired to propel the tractor from one location to another, the master clutch can be disengaged during the time weights 12 are lifted; and as previously related, the pawl and ratchet mechanisms 56, 57 will hold the weights against falling. This will permit propulsion of the tractor without dragging of the weights. Since control lever 89 for the master clutch is at the operator's station, the operator has ready control of the entire apparatus; and only a single operator is required. The attachment unit of my invention may be quickly, detachably mounted on the tractor. In doing so, it is only necessary to secure the framework on the tractor, and make suitable connection between the master clutch structure and sprocket chain 81. When mounted on the tractor, a self-propelled, one-main operable apparatus obtains which enables the apparatus to be driven about rapidly for performing its work.

Employment of a plurality of cooperating adjacent weights 12 is a desirable feature of the invention because this causes the material to be broken in irregular shapes which enhances the breaking action. In this connection, it will be observed that the provision of a secondary clutch 22 and associated control mechanism for each weight 12 permits operation of each weight independent of the other; so that the weights need not be arranged to be lifted and to fall together. Thus, one weight may be caused to strike the material after the other one has done so, should this be desired.

I claim:

1. Apparatus of the character described comprising a frame; a weight member mounted for up and down movement in said frame; power means for lifting said member upwardly including a cable connected to said member, a spool for winding and unwinding of said cable, and drive interrupting and establishing mechanism connectable to said spool; means for automatically disconnecting said drive interrupting and establishing mechanism from said spool upon lifting of said member to a predetermined height to allow said member to fall by gravity; and means associated with said spool to arrest movement thereof when falling of said member is arrested to preclude fouling of said cable.

2. Apparatus of the character described comprising a weight member mounted for up and down movement; power means for lifting said member upwardly including a cable connected to said member, a spool for winding and unwinding of said cable, and clutching means including a movable clutch element connectable to said spool and control mechanism for said clutch element; and mechanism for automatically controlling lifting and falling of said member comprising a trip member movable with said cable for engaging said control mechanism upon lifting of said weight member to a predetermined height to disengage said clutching means and allow said weight member to fall by gravity, and another trip member movable with said cable for engaging said control mechanism upon falling of said weight member a predetermined extent to engage said clutching means and cause said weight member to be lifted.

3. Apparatus of the character described comprising a weight member mounted for up and down movement; power means for lifting said member upwardly including a cable connected to said member, a spool for winding and unwinding of said cable, and clutching means including a movable clutch element connectable to said spool and control mechanism for said clutch element; and mechanism for automatically controlling lifting and falling of said weight member comprising a trip member secured to said cable for engaging said control mechanism upon lifting of said weight member to a predetermined height to disengage said clutching means and allow said weight member to fall by gravity, and a second cable windable and unwindable with said first mentioned cable and having a trip member secured thereto for engaging said control mechanism upon falling of said weight member a predetermined extent to engage said clutching means and cause said weight member to be lifted.

4. Apparatus of the character described comprising a weight member mounted for up and down movement; power means for lifting said member upwardly including a cable connected to said member, a spool for winding and unwinding of said cable, and clutching means including a movable clutch element connectable to said spool and control mechanism for said clutch element, said control mechanism including an upright axially movable rod adjacent said cable having a lower trip element and an upper trip element; and mechanism for automatically controlling lifting and falling of said weight member comprising a trip member secured to said cable for engaging said upper trip element upon lifting of said weight member to a predetermined height to disengage said clutching means and allow said weight member to fall by gravity, and a second cable windable and unwindable with said first mentioned cable and having a trip member secured thereto for engaging said lower trip element upon falling of said weight member a predetermined extent to engage said clutching means and cause said weight member to be lifted.

5. Apparatus of the character described comprising a frame; a weight member mounted for up and down slidable movement in said frame; power means for lifting said member upwardly including a cable connected to said member, a spool for winding and unwinding of said cable, and clutching means including a movable clutch element connectable to said spool and control mechanism for said clutch element, said control mechanism including an upright axially movable rod adjacent said cable having a lower trip element and an upper trip element, said upper trip element comprising an arm pivotally mounted on said rod and having an eye through which said cable passes and said lower trip element comprising a finger projecting from said rod; and mechanism for automatically controlling lifting and falling of said weight member comprising a trip member secured to said cable for engaging said upper trip element upon lifting of said weight member to a predetermined height to disengage said clutching means and allow said weight member to fall by gravity, and a second cable windable and unwindable with said first mentioned cable and having a trip member adjacent the lower end thereof for engaging said lower trip element upon falling of said weight member a predetermined extent to engage said clutching means and cause said weight member to be lifted.

6. Apparatus of the character described comprising a weight member mounted for up and down movement; power means for lifting said member upwardly including a cable connected to said member, a spool for winding and unwinding of said cable, and clutching means including a movable clutch element connectable to said spool and control mechanism for said clutch element, said control mechanism including an upright axially movable rod adjacent said cable having a lower trip element and an upper trip element, said upper trip element comprising an arm pivotally mounted on said rod and having an eye through which said cable passes and said lower trip element comprising a finger projecting laterally from said rod; and mechanism for automatically controlling lifting and falling of said weight member comprising a trip member secured to said cable for engaging said upper trip element upon lifting of said weight member to a predetermined height to disengage said clutching means and allow said weight member to fall by gravity, and a second cable windable and unwindable with said first mentioned cable and having a trip member adjacent the lower end thereof for engaging said lower trip element upon falling of said weight member a predetermined extent to engage said clutching means and cause said weight member to be lifted, said second cable being guided within an upright tube having a slot adjacent the lower end thereof through which said finger extends.

7. Apparatus of the character described comprising a weight member mounted for up and down movement; power means for lifting said member upwardly including a cable connected to said member, spool means comprising a plurality of sections secured for rotation together about the same axis and which are constructed to provide different speeds for winding of cables secured thereto, and clutching means including a movable clutch element connectable to said spool means and control mechanism for said clutch element, said cable being secured to one of said sections; and mechanism for automatically controlling lifting and falling of said weight member comprising a trip member secured to said cable for engaging said control mechanism upon lifting of said weight member to a predetermined height to disengage said clutching means and allow said weight member to fall by gravity, and a second cable secured to another of said sections which has a faster winding speed than the section to which said first mentioned cable is secured, said second cable having a trip member adjacent the lower end thereof for engaging said control mechanism upon falling of said weight member a predetermined extent to engage said clutching means and cause said weight member to be lifted.

8. Apparatus of the character described comprising a weight member mounted for up and down movement; power means for lifting said member including master drive interrupting and establishing mechanism connectable to a source of power, a flexible member connected to the weight member, a spool for winding and unwinding of the flexible member and secondary drive interrupting and establishing mechanism in the drive from said master mechanism and connectable to the spool; means for automatically disconnecting said secondary mechanism upon lifting of said weight member to a predetermined height to allow such weight member to fall by gravity; and means to hold said weight member against falling when said secondary mechanism is connected and said master mechanism is disengaged before said weight member reaches said predetermined height.

9. Apparatus of the character described comprising a weight member mounted for up and down movement; power means for lifting such member upwardly including a flexible member connected to the weight member, a spool for winding and unwinding of the flexible member, and drive interrupting and establishing mechanism connectable to the spool; means for disconnecting the drive interrupting and establishing mechanism from said spool upon lifting of the weight member to a predetermined height to allow such member to fall by gravity; and means associated with the spool to arrest movement thereof when falling of the weight member is arrested to preclude fouling of the flexible member.

10. Apparatus of the character described comprising a weight member mounted for up and down movement; power means for lifting such member upwardly including a flexible member connected to the weight member, a spool for winding and unwinding of the flexible member, and drive interrupting and establishing means including a movable element connectable to the spool and control mechanism for such element; and mechanism for automatically controlling lifting and falling of the weight member comprising a trip member movable with the flexible member for engaging the control mechanism upon lifting of the weight member to a predetermined height to disengage the drive interrupting and establishing means and allow the weight member to fall by gravity, and another trip member movable with the flexible member for engaging the control mechanism upon falling of the weight member a predetermined extent to engage the drive interrupting and establishing means and cause the weight member to be lifted.

11. Apparatus of the character described comprising a weight member mounted for up and down movement; power means for lifting such member upwardly including a flexible member connected to the weight member, a spool for winding and unwinding of the flexible member, and drive interrupting and establishing means including a movable element connectable to the spool and control mechanism for such element; and mechanism for automatically controlling lifting and falling of the weight member comprising a trip member secured to the flexible member for engaging the control mechanism upon lifting of the weight member to a predetermined height to disengage the drive interrupting and establishing means and allow the weight member to fall by gravity, and another flexible member windable and unwindable with said first mentioned flexible member and having a trip member secured thereto for engaging the control mechanism upon falling of the weight member a predetermined extent to engage the drive interrupting and establishing means and cause the weight member to be lifted.

12. Self-propelled apparatus of the character described comprising a source of power for propelling the apparatus; a weight member mounted for up and down movement; power means for lifting said member including master drive interrupting and establishing mechanism connectable to the source of power, and secondary drive interrupting and establishing mechanism in the drive from said master mechanism; means for automatically disconnecting said secondary mechanism upon lifting of the weight member to a predetermined height to allow such weight member to fall by gravity; and means automatically operable to hold the weight member against falling upon disengagement of the master mechanism during lifting of the weight member.

13. Self-propelled apparatus of the character described comprising a source of power for propelling the apparatus; a weight member mounted for up and down movement; power means for lifting said member including master drive interrupting and establishing mechanism connectable to the source of power, and secondary drive interrupting and establishing mechanism in the drive from said master mechanism; means for automatically disconnecting said secondary mechanism upon lifting of the weight member to a predetermined height to allow such weight member to fall by gravity; and pawl and ratchet mechanism associated with the secondary drive interrupting and establishing mechanism for automatically holding the weight member against falling upon disengagement of the master mechanism during lifting of the weight member.

FREDERICK C. GEDGE.